Figure 1:
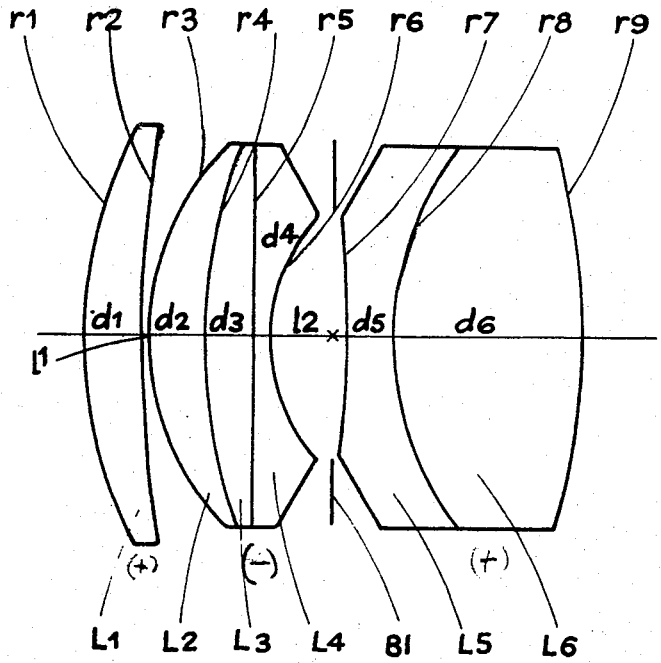

Dec. 22, 1953              L. J. BERTELE             2,663,221
OPTICAL OBJECTIVE COMPRISING SIX LENSES GROUPED
INTO THREE AIR SPACED COMPONENTS
Filed Aug. 28, 1950

Inventor:
Ludwig Jakob Bertele;
By his attorneys,
Baldwin + Wight

Patented Dec. 22, 1953

2,663,221

UNITED STATES PATENT OFFICE 2,663,221

OPTICAL OBJECTIVE COMPRISING SIX LENSES GROUPED INTO THREE AIR SPACED COMPONENTS

Ludwig Jakob Bertele, St. Gall, Switzerland

Application August 28, 1950, Serial No. 181,847

Claims priority, application Switzerland September 8, 1949

8 Claims. (Cl. 88—57)

The invention relates to optical objectives intended mainly but not exclusively for photography. In order to simplify the description and claims the object will be defined as the focal plane at the greater distance from the corresponding principal focal plane. That at the smaller distance from the corresponding focal plane will be referred to as the image. Thus, when used for photography, the object will be the scene photographed and the image the sensitive surface of the plate or film.

A known type of objective consists of six lenses grouped into three air-spaced components, of which the outer two are converging components and the middle one of meniscus form convex towards the object. The air space between the front component, i. e. the one towards the object, and the second or middle component has the form of a diverging lens convex towards the object and the air space between the middle and rear components the form of a converging lens which has its more strongly curved side towards the object. The component facing the object is a single converging lens, the component facing the image is a doublet composed of a negative and a positive lens, and the middle meniscus-shaped component between the outer components is a triplet of which the three single lenses are generally cemented.

Since lens surfaces can now be treated to reduce the reflection therefrom considerably, it is possible to dispense partly with cementing, so that an air space of slight thickness may occur between the adjacent surfaces of the front and middle lenses of the middle component. The lens surfaces bounding such air space may then differ slightly in radius of curvature.

The constructional forms already known of the kind of objective referred to still exhibit distortion to an extent which makes it desirable to reduce this aberration, and the invention is directed to a modification of the objective with this end in view.

According to the invention, in an objective of the kind referred to, the difference between the refractive indices for the $d$-line of the negative and positive lenses of the rear component is selected larger than 0.165 and the radii of the cemented or juxtaposed surfaces of the same are greater than $0.38\ f$ and smaller than $0.50\ f$ where $f$ is the focal length of the complete objective. It is advantageous to select the specified difference between the refractive indices as high as possible, the limit only being set by the kinds of glass available.

In order to keep spherical aberration sufficiently low when using an image field of about 40 to 50°, it is advantageous to fulfill one or both of the following conditions:

a. The sum of the reciprocals of the radii of curvature of the front surfaces of the two first components diminished by the reciprocal of the radius of curvature of the rear surface of the front component is between $$\frac{4.5}{f}$$

and $$\frac{3.5}{f}$$

and the thickness of the second component is between $0.12f$ and $0.21f$.

b. The adjacent surfaces of the third and fourth lenses, that is the middle and rear lenses of the second component, have a curvature between $\infty f$ and $-1f$, that is they are flat or convex towards the image.

To reduce distortion it has also been found advantageous to keep the quotient of the axial thickness of the rear lens of the rear component by that of the front lens of the same component between 2 and 5.

The invention is illustrated by two examples shown in Figures 1 and 2 of the accompanying drawing, particulars being given in the tables set out hereinafter.

Both examples have an aperture ratio of f/2 and a total focal length of 100 mm. and exhibit an image field of 45° to 50°.

In Example 1 the difference between the refractive indices of the lenses in the rear component is 0.1653, that is greater than 0.165. The radius of the cemented pair of surfaces is $0.395f$. The sum of the reciprocals of the radii of the front surfaces of the two first components diminished by the reciprocal of the radius of the rear surface of the front component is $$\frac{4.03}{f}$$

The axial thickness of the second component is $0.163f$ and the quotient of the axial thickness of the rear lens of the rear component by that of the front lens of the same component is 4.1.

In Example 2 the difference between the refractive indices is 0.19 and the radius of the cemented pair of surfaces is $0.42f$. The sum of the reciprocals of the radii of the front surfaces of the two first components diminished by the reciprocal of the radius of the rear surface of the front component is $$\frac{4.03}{f}$$

The axial thickness of the second component is 0.1593f and the quotient of the axial thickness of the rear lens of the rear component by that of the front lens of the same component is 3.38.

In both examples the sum of the refractive indices of the front component and the front lens of the middle component is 3.38.

In the tables and drawing:

L are the individual lenses,
r are the radii of curvature of the individual lens surfaces,
d are the lens thicknesses,
l are the air spaces between the separate lenses,
n are the refractive indices,
V are the Abbé numbers, and
Bl denotes the diaphragm.

The symbols L, r, d and l are provided with numerical suffixes denoting their order from the front.

Example 1

| | | | $n_d$ | V |
|---|---|---|---|---|
| $L_1$ | $r_1=+57.93$ | $d_1=7.65$ | 1.6910 | 54.8 |
| | $r_2=+176.3$ | $l_1=0.37$ | | |
| $L_2$ | $r_3=+34.864$ | $d_2=7.78$ | 1.6910 | 54.8 |
| | $r_4=+74.07$ | | | |
| $L_3$ | | $d_3=6.54$ | 1.5019 | 67.0 |
| $L_4$ | $r_5=\infty$ | $d_4=1.98$ | 1.6727 | 32.2 |
| | $r_6=+23.514$ | $l_2=10.0$ | | |
| | $r_7=-172.84$ | | | |
| $L_5$ | | $d_5=6.1$ | 1.5014 | 56.5 |
| | $r_8=+39.51$ | | | |
| $L_6$ | | $d_6=25.0$ | 1.6667 | 48.4 |
| | $r_9=-88.64$ | | | |

This objective is shown in Figure 1 of the drawing.

Example 2

| | | | $n_d$ | V |
|---|---|---|---|---|
| $L_1$ | $r_1=+57.93$ | $d_1=7.65$ | 1.6910 | 54.8 |
| | $r_2=+162.96$ | $l_1=0.37$ | | |
| $L_2$ | $r_3=+34.305$ | $d_2=7.78$ | 1.6910 | 54.8 |
| | $r_4=+74.07$ | | | |
| $L_3$ | | $d_3=6.17$ | 1.4645 | 65.7 |
| $L_4$ | $r_5=+839.5$ | $d_4=1.98$ | 1.6477 | 33.9 |
| | $r_6=+23.353$ | $l_2=10.0$ | | |
| | $r_7=-172.84$ | | | |
| $L_5$ | | $d_5=7.4$ | 1.5014 | 56.5 |
| | $r_8=+41.98$ | | | |
| $L_6$ | | $d_6=25.0$ | 1.6910 | 54.8 |
| | $r_9=-100.99$ | | | |

Figure 2:
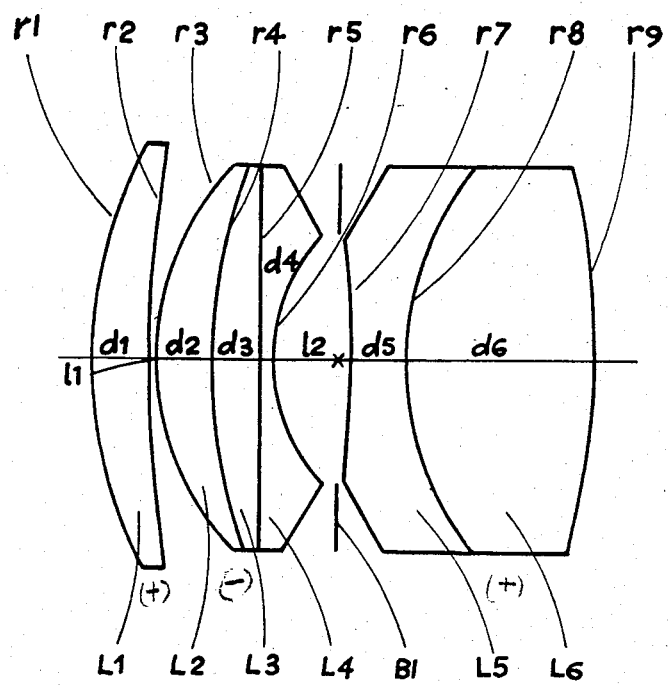

This objective is shown in Figure 2 of the drawing.

In objectives according to the invention the distortion is reduced to a value permissible for ordinary photographic purposes.

I claim:

1. An optical objective made up of six lenses grouped into three components separated by air spaces of which the first lens counting from the object side is a converging lens constituting the first component, the second, third and fourth lenses constitute the second component which is of meniscus form convex towards the object, and the fifth and sixth lenses are of negative and positive power respectively and constitute the third component the air space between said first and second components having the form of a diverging lens convex towards the object and the air space between said second and third component having the form of a converging lens with its more strongly curved face towards the object, characterised in that the difference between the refractive indices for the d-line of the fifth and sixth lenses exceeds 0.165 and that the radii of curvature of the adjacent surfaces of the said lenses are greater than 0.38f and less than 0.50f where f is the focal length of the complete objective.

2. An objective as defined in claim 1, characterised in that the adjacent surfaces of the lenses constituting respectively the second and third components are cemented.

3. An objective as defined in claim 1, characterised in that the difference between the refractive indices for the d-line of the fifth and sixth lenses is 0.1653 and that the radii of curvature of the adjacent surfaces of the said lenses are both 0.395f.

4. An objective as defined in claim 1, characterised in that the difference between the refractive indices for the d-line of the fifth and sixth lenses is 0.19 and that the radii of curvature of the adjacent surfaces of the said lenses are both 0.42f.

5. An objective as defined in claim 1, characterized in that the adjacent surfaces of the front and middle lenses of the middle component remain uncemented.

6. An objective as defined in claim 1, characterized in that the sum of the reciprocals of the radii of curvature of the front surfaces of the first two components diminished by the reciprocal of the radius of curvature of the rear surface of the front component is comprised within the range of $$\frac{4.5}{f}$$

to $$\frac{3.5}{f}$$

and the axial thickness of the second component is greater than 0.12f and smaller than 0.21f.

7. An objective as defined in claim 1, characterized in that the radius of the rear surface of the third lens lies between $\infty f$ and $-1f$.

8. An objective as defined in claim 1, characterized in that the quotient of the axial thickness of the rear lens of the rear component by that of the front lens of the same component is between 2 and 5.

LUDWIG JAKOB BERTELE.

References Cited in the file of this patent

UNITED STATES PATENTS

| Number | Name | Date |
|---|---|---|
| 1,975,677 | Bertele | Oct. 2, 1934 |
| 1,998,704 | Bertele | Apr. 23, 1935 |
| 2,029,806 | Bertele | Feb. 4, 1936 |
| 2,124,356 | Rayton | July 19, 1938 |
| 2,188,523 | Bertele | Jan. 30, 1940 |